United States Patent
Zhang et al.

(10) Patent No.: US 9,725,563 B2
(45) Date of Patent: Aug. 8, 2017

(54) FIBER REINFORCED THERMOSET COMPOSITES AND METHODS OF MAKING

(71) Applicant: JOHNS MANVILLE, Denver, CO (US)

(72) Inventors: Mingfu Zhang, Highlands Ranch, CO (US); Jawed Asrar, Englewood, CO (US); Asheber Yohannes, Littleton, CO (US); Klaus Friedrich Gleich, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 438 days.

(21) Appl. No.: 14/172,947

(22) Filed: Feb. 5, 2014

(65) Prior Publication Data

US 2016/0108189 A1    Apr. 21, 2016

(51) Int. Cl.
*C08J 5/06* (2006.01)
*C08J 3/24* (2006.01)
*C08J 5/08* (2006.01)

(52) U.S. Cl.
CPC ............ *C08J 5/08* (2013.01); *C08J 3/242* (2013.01); *C08J 5/06* (2013.01); *C08J 2363/00* (2013.01)

(58) Field of Classification Search
CPC .................................. C08J 5/06; C08J 3/242
See application file for complete search history.

(56) References Cited

U.S. PATENT DOCUMENTS

| | | | | | |
|---|---|---|---|---|---|
| 2,999,834 | A | * | 9/1961 | Wismer | B01J 31/0202 523/206 |
| 3,523,032 | A | * | 8/1970 | Kujas | C08G 59/5073 427/302 |
| 3,773,702 | A | * | 11/1973 | Ohashi | C08F 299/026 156/310 |
| 4,767,805 | A | * | 8/1988 | Tada | C07D 303/24 523/206 |
| 6,110,993 | A | * | 8/2000 | Saito | C08G 59/4021 523/211 |
| 6,750,272 | B2 | * | 6/2004 | Kessler | C08F 32/00 523/211 |
| 8,575,253 | B2 | * | 11/2013 | Pierik | B60C 1/0016 252/186.1 |
| 2004/0195731 | A1 | | 10/2004 | Rische et al. | |
| 2016/0108188 | A1 | * | 4/2016 | Zhang | B05D 1/02 523/217 |

FOREIGN PATENT DOCUMENTS

| | | | | |
|---|---|---|---|---|
| DE | 3041051 | A1 | * 6/1982 | ............. C08J 3/242 |
| DE | 3233010 | A1 | * 4/1983 | ........... C25D 7/0614 |
| DE | 33 36 845 | A1 | 4/1985 | |
| EP | 0 256 852 | A2 | 2/1988 | |
| JP | 52045672 | A | * 4/1977 | |
| JP | 60167975 | A | * 8/1985 | |

OTHER PUBLICATIONS

Machine translation of DE 3233010 A1, Apr. 1983.*
Machine translation of DE 3041051 A1, Jun. 1982.*
Derwent abstract 1985-253297 for JP 60-167975 A, Aug. 31, 1985.*
Fuest, Ronald W., Polyurethane Elastomers, "Rubber Technology: Compounding and Testing for Performance," Jul. 1, 2001, Chapter 9, 1st Edition, Hanser Gardner Publications.

* cited by examiner

*Primary Examiner* — Vickey Nerangis
(74) *Attorney, Agent, or Firm* — Robert D. Touslee

(57) ABSTRACT

Methods of making a fiber-reinforced composite are described. The methods may include applying a sizing composition to a plurality of fibers to make sized fibers, where the sizing composition may include at least one of a curing agent or an accelerator for a resin composition. The sized fibers may be contacted with the resin composition to form a resin-fiber amalgam, where the resin composition includes 50 wt. % or less of a total amount of the curing agent and the accelerator that is also present on the sized fibers. The resin-fiber amalgam may then be cured to form the fiber-reinforced composite.

12 Claims, 3 Drawing Sheets

FIBER REINFORCED THERMOSET COMPOSITES AND METHODS OF MAKING

BACKGROUND OF THE INVENTION

Thermoset resins have been used in many varieties of fiber-reinforced composites to make parts and articles used in automobiles, aircraft, watercraft, wind turbines, construction materials, and many other types of equipment. Prior to curing, many of these resin compositions have relatively low viscosity, making them easy to mix with glass fibers and pellets to form a curable amalgam that is hardened into the final fiber-reinforced composite.

Typically, the resin compositions include polymerizable organic compounds and one or more agents that facilitate the polymerization of the organic compounds under curing conditions. In many instances, the agents are mixed with the polymerizable organic compounds just before the resin composition is introduced to the fibers. When the agents are mixed too early with the polymerizable organic compounds, they tend to cure prematurely and have to be discarded. In other words, the curable resin composition that includes both the polymerizable organic compounds and the requisite polymerization agents tend to have a relatively short shelf life or pot life.

In many instances, even if the pot life of the mixture of agents and polymerizable organic compounds is long enough to permit pre-mixing before the resin composition is introduced to the fibers, low threshold temperatuers are required to prevent premature resin curing. At lower temperature, the resin composition typically has a higher viscosity that requires higher processing pressures when forming the resin-fiber amalgam.

The short pot life and low threshold temperature of the resin compositions can create many difficulties in the manufacturing process. For example, production slowdowns caused by equipment breakdowns and clogs, quality control checks, and adjustments during manufacturing can waste large quantities of a prematurely hardening resin composition. These breakdowns are generally more frequent when the system is stressed by low-temperature, high-viscosity resin compositions. Because most thermoset resins are not recyclable like metal and glass, the hardened resins cannot be recovered. The short pot life often requires rapid mixing of the polymerizable organic compounds with the polymerization agents. This can require additional processing equipment to monitor and maintain a homogeneous resin composition just when it's needed during manufacturing. Thus, there is a need for new manufacturing methods to produce fiber-reinforced resin composites that reduce or eliminate the problems created by the short pot life and/or low threshold temperatures for many thermoset resin compositions. This and other problems are addressed in the present application.

BRIEF SUMMARY OF THE INVENTION

Methods of making fiber-reinforced composites are described where one or more curatives are provided on sized fibers used in the composite. The curatives on the fibers faciliate the polymerization of the thermoset resin that forms the polymer matrix of the composite. Exemplary curatives may include curing agents that become part of the cured thermoset resin, and accelerators that increase the rate of curing in the thermoset resin. The present methods allow the partial (and in some instances complete) removal of a curative from the resin compostion introduced to the sized fibers during the making of the fiber-reinforced composite. The reduction or removal of the one or more curatives from the resin composition provides it a longer pot life and/or higher curing temperature.

Also described are fiber-reinforced composites that are made with sized fibers that contain one or more curatives. Exemplary sized fibers may include glass fibers that are first mixed with a sizing composition that include the curatives, or precursors to the compounds. The sizing composition can leave the surfaces of the sized fibers with some or all of a curative needed to faciliate the polymerization of the resin composition that makes contact with the fibers. In some examples, more than one type of curative may be provided on the sized fibers and at the same time reduced or removed from the resin composition.

The reduction and removal of the curatives from the pre-polymerized resin can significanity increase the pot life of the resin. While these curatives are desirably designed to faciliate polymerization of the resin under raised-temperature curing conditions, they can often start polymerization even under more mild conditions when the resin is mixed with the fibers. If polymerization occurs to a great extent, the resin becomes too viscous to mix properly with the fibers and often has to be discarded. For the purposes of the present Application, the pot life is measured from the time all the components have been added to the pre-polymerized resin composition to the time the composition becomes too viscous to properly mix with the fibers.

Embodiments of the present methods of making a fiber-reinforced composite may include applying a sizing composition to a plurality of fibers to make sized fibers, where the sizing composition may include at least one of a curing agent or an accelerator for a resin composition. The sized fibers may be contacted with the resin composition to form a resin-fiber amalgam, where the resin composition includes 50 wt. % or less of a total amount of the curing agent and the accelerator that is also present on the sized fibers. The resin-fiber amalgam may then be cured to form the fiber-reinforced composite.

Embodiments of the invention also include methods of extending a shelf-life of a resin composition used to make a fiber-reinforced composite. The methods may include applying a sizing composition to a plurality of fibers to make sized fibers, where the sizing composition comprises at least one of a curing agent or an accelerator for a resin composition. The methods may further include contacting the sized fibers with the resin composition to form a resin-fiber amalgam, and curing the resin-fiber amalgam to form the fiber-reinforced composite. The resin composition has at least twice the shelf-life of a resin mixture comprising the resin composition mixed with the entire curing agent or accelerator.

Embodiments of the invention further include fiber-reinforced composites made from sized fibers. The sized fibers are made by contacting a plurality of fibers with a sizing composition that includes at least one of a curing agent and an accelerator. The fiber-reinforced composites also include a resin composition that lacks at least one of the curing agent and the accelerator.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

The present methods include combining a thermoset resin with fibers sized with a sizing composition that includes a curing agent, accelerator, or both for the thermoset resin. The placement of some or all of the curing agent and/or acclearator on the sized fibers permits lower concentrations of these components in the thermoset resin. The lower concentration, or in some instances the absence, of the curatives in the resin increases its pot-life. The low curative concentrations may also permit lowering the resin's viscosity by heating it to higher temperatures without premature curing.

Figure 1:
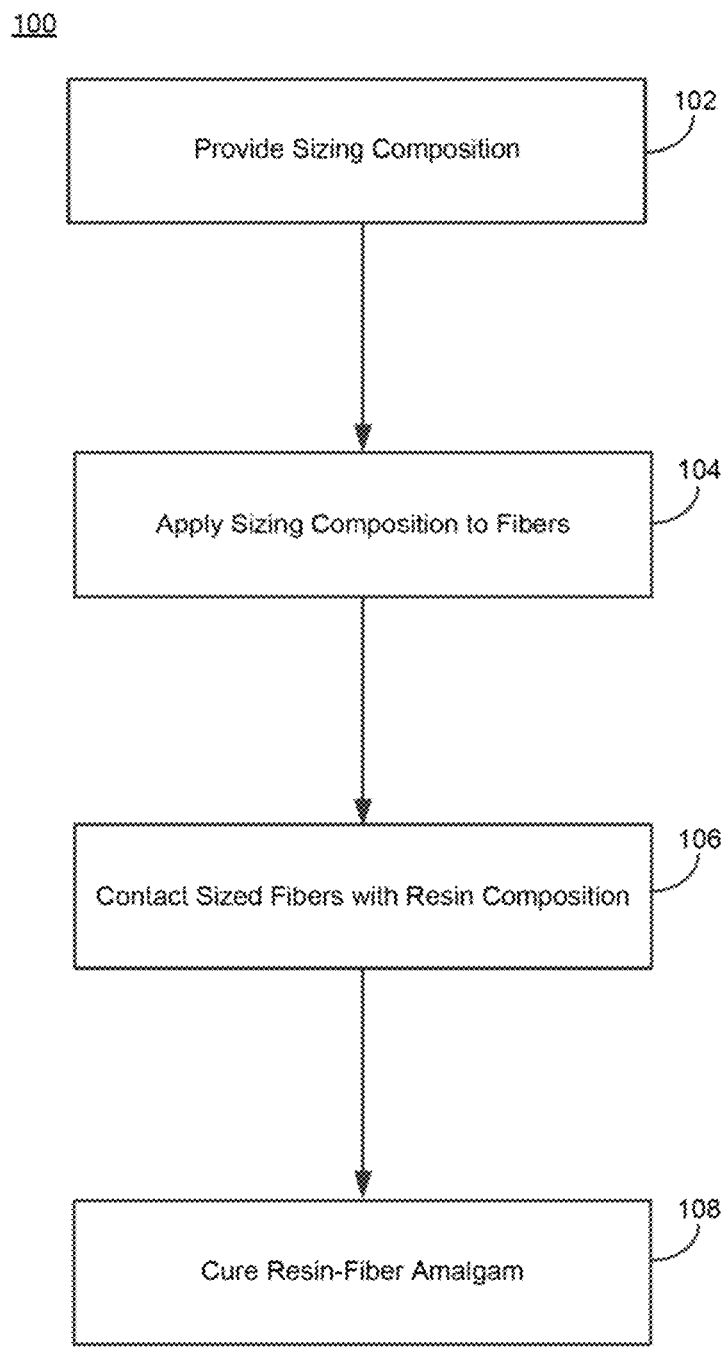
FIG. 1 shows selected steps in a method of making a fiber-reinforced composite according to embodiments of the invention.

FIG. 1 shows selected steps in methods 100 of making a fiber-reinforced composite according to present methods. The methods 100 may include providing the a sizing composition 102 that has at least one of a curing agent or an accelerator for the thermoset resin used in the fiber-reinforced composite. The curing agent and/or accelerator present in the sizing composition varies depending on the thermoset resin. For example, if the thermoset resin is an epoxy resin, the curing agent and accelerator are selected to help harden the epoxy polymer under curing conditions. The curing agent reacts with the reactive epoxy oligomers to become part of the final hardened thermoset polymer structure of the fiber-reinforced composite. The curing agent is often polyfunctional and capible of bonding with more than one reactive site of the epoxy oligomers. The multiple bonding reactions between the curing agent and the epoxy oligomers forms a crosslinked network of the hardened thermoset polymer in the fiber-reinforced composite. The accelerator may increase the curing rate of the thermoset resin, reduce its curing temperature, or both. It may or may not be incorporated into the hardened polymer structure of the composite. In some instances, an accelerator that is not irreversibly chemically altered during the curing of the thermoset resin may be referred to as a catalyst. In additional instances, an accelerator that is irreversibly altered during the curing.

Exemplary curing agents for an epoxy resin may include amines, organic acids, organic anhydrides, alcohols, amides, and thiols, among other epoxy resin curing agents. In some specific applications, epoxy resin curing agents may also include phenol-formaldehyde compounds and amino-formaldehyde compounds, and polyamide compounds. Exemplary amine curing agents may include aliphatic amines, cycloaliphatic amines, polyether polyamines, dicyandiamide amines, and aromatic amines, among other amines.

The amines may include primary amines, secondary amines, and tertiary amines. The amines may include monoamines, and polyamines having two or more amine groups. They may also include unmodified amines, and modified amines that contain other functional groups capable of reacting with the expoxy resin, such as hydroxyl groups (—OH), carboxyl groups (—COOH), amide groups (—C(═O)N—), and anhydride groups, among other groups. For example, the amine curing agent may be a polyfunctional primary amine that undergoes an addition reaction with the epoxy resin to form a hydroxyl group and a secondary amine. The secondary amine may react with another epoxy group on the epoxy resin to form a tertiary amine and a second hydroxyl group. Specific examples of amine curing agents may include ethylene amines (e.g., ethylene diamine (EDA), diethylene triamine (DETA), triethylene tetramine (TETA), and tetraethylene pentamine (TEPA)); 3,3'-dimethylmethylene-di(cyclohexylamine); methylene-di(cyclohexylamine); 4,4'-diaminodiphenyl methane (DDM); m-phenylene diamine (MPD); 3,3'-diaminodiphenyl sulphone (3,3'-DDS); 4,4'-diaminodiphenyl sulphone (4,4'-DDS); and dicyandiamide among other amine curing agents. Exemplary curing agents may also include dicyandiamide and guanidine.

Exemplary organic acids and organic acid anhydrides may include organic diacids such as phthalic acid, tetrahydrophthalic acid, hexahydrophthalic acid, trimellitic acid, pyromellitic acid, methylnadic acid, chlorendic acid, tetrabromophthalic acid, and dichloromaleic acid, among other organic acid. They may also include the corresponding organic anhydrides such as phthalic anhydride, tetrahydrophthalic anhydride, hexahydrophthalic anhydride, trimellitic anhydride, pyromellitic anhydride, methylnadic anhydride, chlorendic anhydride, tetrabromophthalic anhydride, and dichloromaleic anhydride, among other organic anhydrides.

Exemplary alcohols may include polyols and polyfunctional alcohols that have one or more functional groups capable of reacting with the epoxy resin beyond a hydroxyl group. Exemplay alcohols may include phenols, and polyphenols such as bisphenol A. Exemplary thiols (also known as mercaptans) may include polymercaptan compounds, and polysulfide resins.

As noted above, the thermoset resin may be combined with an accelerator, and in some instances where an accelerator used, at least a portion of the accelerator may be found in the sizing composition used to make sized fibers. Exemplary accelerators that may be used in conjunction with with an epoxy resin may include alcohols, carboxylic acids, amines, and urea compounds, and lewis acids, among other accelerators. For example, alcohol accelerators may include benzyl alcohol, and carboxylic accelerators may include salicylic acid. Amine accelerators may include tertiary amines such as benzyl dimethyl amine (BDMA), and 2,4,6-tris-dimethylaminomethyl-phenol. They may also include amine complexs such as monoethylamine boron trifluoride amine complexes, and boron trichloride amine complexes. Exemplary accelerators may also include urea compounds such as aryl dimethylurea compounds like 3-(4-chlorophenyl)-1,1-dimethyl urea (Monuron), and toluene bisdimethylurea.

It should be appreciated that some compounds may act as both a curing agent and an accelerator as those terms are used in the present application. For example imidazoles may function as both curing agents and accelerators for epoxy resins. Exemplary imidazole curing agents/accelerators may include unmodified imidazoles and modified imidazoles that include additional functional groups capable of reacting with the epoxy resin, such as hydroxyl groups, cyano groups, and carboxylic acid groups, among others. Specific examples of imidazoles may include 2-methylimidazole, 2-ethyl-4-methylimidazole, 1-cyanoethyl-2-undecylimidazolium trimellitate, among other imidazoles.

The sizing composition may also include additional compounds beyond the curing agent and/or accelerator for the thermoset resin. For example, the sizing composition may include a solvent (e.g., water, ethyl alcohol), coupling agents, film-forming agents, lubricants, and wetting agent, among other compounds. The coupling agents may act as chemical linking agents by bonding to both the glass fiber and the plastic matrix. Exemplary coupling agents may include silanes containing organosilane groups may be coupling agents for glass fibers and organic polymers, and serve to bond the two materials in the composite article. Film forming agents may provide a desired degree of bonding between the fibers in the fiber strands to avoid fuzzing during processing in fiber manufacturing operations and/or fiber composite fabrication operations. Lubricants help protect the surface of the fibers from scratches and abrasions commonly caused by fiber-to-fiber contact and friction during processing. Wetting agents facilitate the wetting of the sizing composition on the surface of the fibers, and may also facilitate the wetting of the thermoset resin on the surface of the sized fibers.

Returning to FIG. 1, the above-described sizing composition may be applied to the fibers 104. The application of the sizing composition to the fibers may be achieved by kiss-roll coating, spraying, dipping, contacting, and/or mixing the liquid sizing composition and the fibers. The wet sized fibers may be exposed to elevated temperature and/or turbulent flow conditions to accelerate their drying.

Exemplary fibers used in the present sizing applications may include one or more types of fibers chosen from glass fibers, ceramic fibers, carbon fibers, metal fibers, and organic polymer fibers, among other kinds of fibers. Exemplary glass fibers may include "E-glass", "A-glass", "C-glass", "S-glass", "ECR-glass" (corrosion resistant glass), "T-glass", and fluorine and/or boron-free derivatives thereof. Exemplary ceramic fibers may include aluminum oxide, silicon carbide, silicon nitride, silicon carbide, and basalt fibers, among others. Exemplary carbon fibers may include graphite, semi-crystalline carbon, and carbon nano tubes, among other types of carbon fibers. Exemplary metal fibers may include aluminum, steel, and tungsten, among other types of metal fibers. Exemplary organic polymer fibers may include poly aramid fibers, polyester fibers, and polyamide fibers, among other types of organic polymer fibers.

The fiber length may range from short-to-intermediate chopped fibers (e.g., about 0.5 inches or less in length), long fibers (e.g., more than about 0.5 inches in length), to continuous fibers. In addition to imparting reactive curing properties to the fibers, the sizing composition fibers may enhance the fibers' physical characteristics in a number of ways including increased hardness, increased mechanical strength, greater wettability, and increased adhesion between the fibers and resin.

Once the fibers are sized, they may then be contacted with the thermoset resin composition to make a fiber-resin amalgam 106. As noted above, one exemplary thermoset resin is an epoxy resin. Exemplary epoxy resins may include reactive epoxy oligomers, prepolymers, and polymers that contain reactive epoxy groups that can react with the curing agent to form a hard thermoset polymer with high temperature and chemical resistance. In the present embodiments, the thermoset epoxy polymer forms the polymer matrix of a fiber-reinforced composite.

Exemplary epoxy resins may include the class of resins formed by the reaction of epichlorohydrins with bisphenol A to form diglycidyl ethers of bisphenol A. These epoxy resins are sometimes referred to as DGEBA (diglycidyl ethers of bisphenol A) or BADGE epoxy resins. Another class of epoxy resins substitute bisphenol F for the bisphenol A used in the DGEBA resins. Exemplary epoxy resins may also include aliphatic epoxy resins, cycloaliphatic epoxy resins, glycidyl epoxy resins, glycidylamine epoxy resins, epoxy phenol novolacs (EPNs), and epoxy cresol novalacs (ECN), among other epoxy resins.

The thermoset resin may include curing agent and/or accelerator that is added to the resin prior to contact with the sized fibers. When the sized fibers include a curing agent and/or accelerator for the thermoset resin, a lower concentration of curing agent and/or accelerator is required in the resin to complete the curing. For example, sized fibers that include a curing agent may contact a resin composition having 50 wt. % or less of the curing agent in the resin composition. For example the resin composition may have 50 wt. % or less, 40 wt. % or less, 30 wt. % or less, 25 wt. % or less, 20 wt. % or less, 15 wt. % or less, 10 wt. % or less, 5 wt. % or less, etc., of the total amount of curing agent while the remainer is supplied by the sized fibers. In some embodiments, all the curing agent may be provided by the sized fibers and there is no curing agent present in the resin composition. Similarly, sized fibers that include an accelerator may contact a resin composition having 50 wt. % or less of the accelerator in the resin composition. For example the resin composition may have 50 wt. % or less, 40 wt. % or less, 30 wt. % or less, 25 wt. % or less, 20 wt. % or less, 15 wt. % or less, 10 wt. % or less, 5 wt. % or less, etc., of the total amount of accelerator while the remainder is supplied by the sized fibers. In some embodiments, all the accelerator may be provided by the sized fibers and there is no accelerator present in the resin composition.

Exemplary weight percentage distribution ratios for the curing agent and/or accelerator in the resin composition and the sized fibers may be 50:50 [resin:fibers], 40:60, 30:70, 20:80, 15:85, 10:90, 5:95, and 0:100. These exemplary weight percentage distribution ratios also include ranges, including 50:50 to 40:60, 40:60 to 30:70, 30:70 to 20:80, 20:80 to 15:85, 15:85 to 10:90, 10:90 to 5:95, and 5:95 to 0:100. They may also be extended across two or more of the above-described ranges, for example 50:50 to 30:70, 50:50 to 0:100, 40:60 to 10:90, and so forth.

In embodiments where both a curing agent and an accelerator are used, either or both of the curing agent and the accelerator in the resin composition may be reduced by the above-describe amounts and distribution ratios for the individual curing agent and accelerator components. In further embodiments where both a curing agent and an accelerator are used, the combined amount of the curing agent and accelerator in the resin composition may be 50 wt. % or less, 40 wt. % or less, 30 wt. % or less, 25 wt. % or less, 20 wt. % or less, 15 wt. % or less, 10 wt. % or less, 5 wt. % or less, etc., of the total amount of curing agent and accelerator, while the remainder is supplied by the sized fibers. For example, when the combined amount of the curing agent and accelerator in the resin composition is 50 wt. %. As noted above, the combined amounts of curing agent and accelerator may have the above-described weight percentage distribution ratios.

The combination of the sized fibers and thermoset resin to make the fiber-resin amalgam may be achieved by thermoset composite manufacturing techniques, including resin-injection molding (RIM), structural resin-injection molding (SRIM), resing transfer molding (RTM), vacuum infusion, wet lay-up processes, spray-up processes, filament winding processes, and pultrusion processes, among other processes. In some embodiments, the fiber-resin amalgam may be formed into sheet molding compounds (SMCs) and/or bulk molding compounds (BMCs) that can be used as raw materials in compression molding techniques to produce the fiber-reinforced composite.

Accompanying or following the formation of the fiber-resin amalgam, the thermoset resin may be cured to form the fiber-reinforced composite 108. The curing conditions may include elevating the temperature of the fiber-resin amalgam above a curing-threshold temperature. They may alternately (or additionally) include exposing the resin-fiber amalgam to light at an energetic enough wavelength (e.g., ultraviolet light) to initiate a chemical reaction between thermoset resin components. The exemplary epoxy resin systems may have a curing-threshold temperature ranging from room temperature (e.g., about 20° C.) to about 180° C. (e.g., 100° C. to 150° C.).

Figure 2:
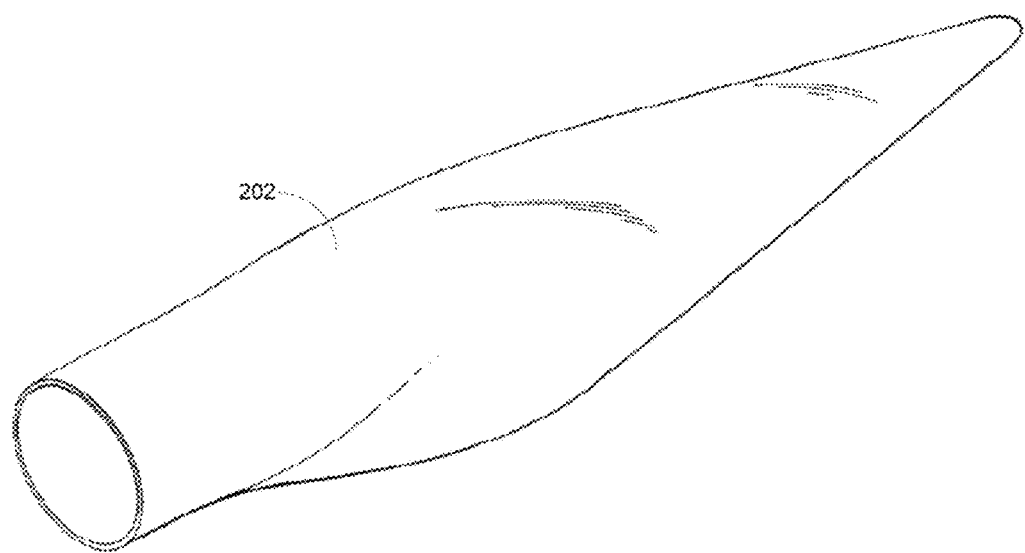
FIG. 2 shows exemplary fiber-reinforced composites made with the present thermoset resin and sized fiber combinations.

FIG. 2 shows an exemplary fiber-reinforced composite wind turbine blade 202 formed by the present fiber-resin amalgams. The blade 202 is one of many types of articles that can be formed by the amalgams. Other articles may include vehicle parts (e.g., aircraft parts, automotive parts, etc.), appliance parts, containers, etc.

EXAMPLES

Experiments were conducted to measure the effects of curing agent concentration in an expoy resin composition, and also to measure the effectiveness of transferring a curing agent from an expoy resin composition to reactive fibers that have been sized with the curing agent. The experiments demonstrate that lowering the concentration of the curing agent in the epoxy resin composition substantially increases the composition's shelf-life (a.k.a, pot-life), as measured by the elapsed time for the composition to reach a particular viscosity. By transferring a portion of the curing agent from the epoxy composition to the sized fibers, the reduced-curing agent resin composition can have at least twice the shelf-life of a conventional resin composition having all the curing agent present in the composition.

The experiments also demonstrate that the curing agent on the sized fibers is cabable of curing the epoxy resin composition as effectively as curing agent premixed and present in the resin composition. Thus, the longer shelf-life demonstrated for the epoxy resin compositions with reduced curing agent concentration does not come at the expense of less efficient curing for the fiber-resin amalgams.

Example 1—Measuring Effect of Curing Agent Concentration on Pot Life

The change in viscosity over time was measured for a series of resin mixtures made from an epoxy resin (EPON 828 from Momentive Specialty Chemicals, Inc.) and different concentrations of a curing agent (EPIKURE 3253 from Momentive Specialty Chemicals, Inc.) to show the effect of curing agent concentation on the pot life of a resin composition. EPON 828 is an undiluted clear difunctional bisphenol A/epichlorohydrin derived liquid epoxy resin. EPIKURE 3253 is tris (dimethyl amion-methyl) phenol. Three samples, including neat EPON 828 epoxy resin and two EPON 828/EPIKURE 3253 mixtures with different mixing ratios were tested.

The viscosity tests were conducted on an AR2000 Rheometer from TA Instruments. A 40 mm 1° steel cone was used for the testing. The viscosity-time profiles of three epoxy resin samples were determined at 30° C. with the oscillation frequency of 100 Hz and the strain of 2%.

Figure 3:
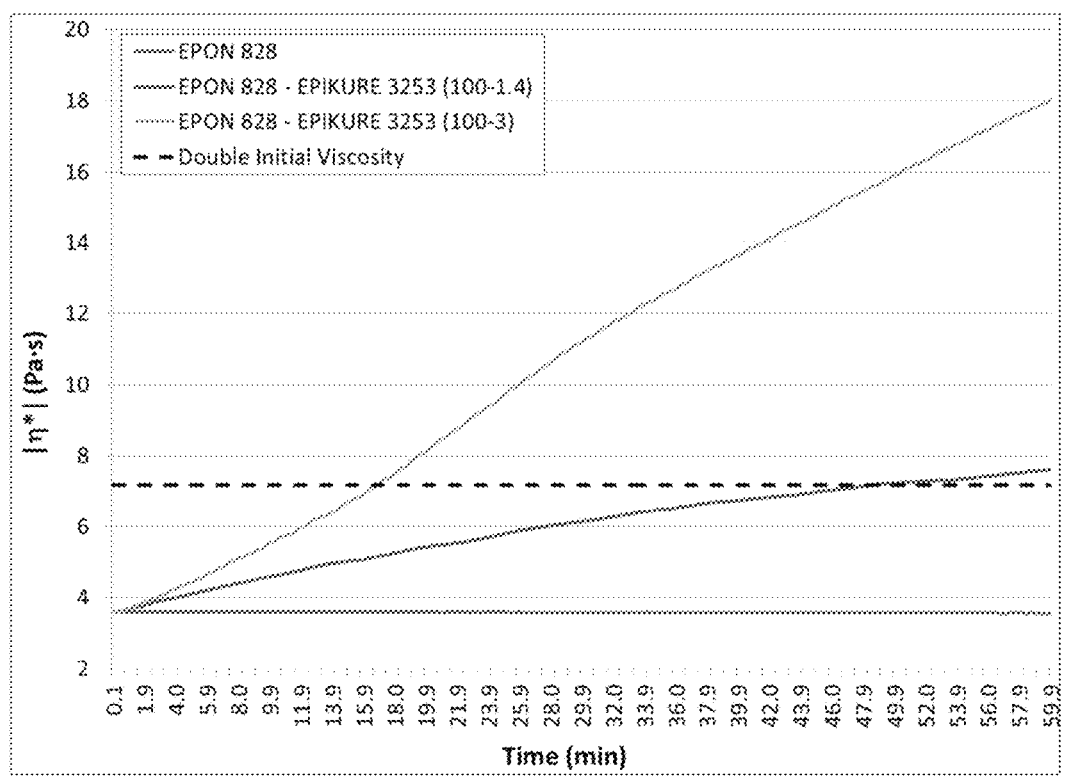
FIG. 3 is a graph showing the change in viscosity over time for an expoxy resin at three different curing agent concentrations.

FIG. 3 shows the change in viscosity over time for an EPON 828 epoxy resin at three concentations of EPIKURE 3253. As expected, the neat EPON 828 epoxy resin with no curing agent had a stable and unchanging viscosity throughout the time period measured. Because the neat sample contains no curing agent, the pot life of this sample extended beyond the measurement period. However, after a small amount of EPIKURE 3253 was added to the epoxy resin, the viscosity of EPON 828 started to increase. For example, when 3% EPIKURE 3253 (i.e., w/w of EPON 828/EPIKURE 3253=100/3) was added, the viscosity of the mixture doubled in <17 minutes and quadrupled in 43 minutes. When a lower concentration of 1.4% EPIKURE 3253 was used, the viscosity increased at a slower but still significant rate, doubling in approximately 49 minutes.

The rate of change in the viscosity of the three measured samples demonstrates that an increasing concentration of a curing agent in a resin composition can significantly reduce its pot life. Conversely, reducing the concentration of the curing agent can significantly extend the resin composition's pot life, and removing the curing agent altogether may extend the pot life indefinitely. By transferring some or all of the required curing agent from the resin composition to the sized reinforcing fibers, the pot life of the resin compositing can be increased substantially. The longer pot life of the resin composition facilitates the manufacturing process of composite materials, enabling especially the production of large composite parts.

Example 2—Measuring Resin Curing Time for Fibers Sized with Curing Agent

The curing time for an epoxy resin (EPON 828) combined with glass fibers was measured to test the reactivity of the fibers with the epoxy resin. Except for the comparative measurement with unsized glass fibers, an aqueous sizing composition with the ingredients listed in Table 1 was applied to the fibers:

TABLE 1

| Makeup of the Sizing Composition | |
| --- | --- |
| Ingredient | Amount (g) |
| Water | 850 |
| Epoxy curing agent[1] | 100 |
| Film former[2] | 50 |

[1]EPIKURE 3253 curing agent from Momentive (Columbus, OH, USA)
[2]Filco 75007 film former from COIM SPA (Italy)

The sizing composition was made by adding 850 grams of DI water and 100 grams of EPIKURE 3253 to a 1-liter beaker. The mixture was stirred until a homogeneous solution was obtained. Under agitation, 50 grams of Filco 75007 emulsion was added. The mixture was stirred for at least 5 minutes until a homogeneous sizing mixture was obtained.

The sizing composition of Table 1 was applied to glass fibers using kiss-roll applicator, after the glass fiber filaments were drawn from a 200-tip bushing. The sized glass fibers were dried in an oven. The LOI (loss on ignition) of the sized fibers was determined to be 4.4%.

The reactivity of the sized fibers was tested in test tubes with EPON 828 resin. As shown in Table 2, without curing agent (Run 1), neat EPON 828 resin is stable at the temperature of 120° C. When 3% EPIKURE 3253 was added (Run 2), EPON 828 resin cured rapidly and the resin mixture solidified after 40 minutes. When the entire curing agent was added onto reinforcing glass fibers, through the application of sizing composition of Table 1, EPON 828 epoxy resin can be cured solely with the curing agent on the sized fibers. As shown in Run 3, when mixed with the sized glass fibers that contain the same amount of curing agent as in Run 2, EPON 828 resin cured and solidified after 40 minutes, indicating a similar rate of curing between Run 2 and Run 3.

TABLE 2

Rate of Resin Curing

| Run # | Resin EPON 828 (g) | EPIKURE 3253 (g) | Sized Glass Fiber (g) | Resin Cure[1] |
|---|---|---|---|---|
| 1 | 10 | 0 | 0 | No reacation after 1-hour |
| 2 | 10 | 0.3 | 0 | Solidified after 40 min. |
| 3 | 10 | 0 | 8.3 | Solidified after 40 min. |

[1]Cure temperature: 120° C.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the fiber" includes reference to one or more fibers and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a fiber-reinforced epoxy composite, the method comprising:
    applying a sizing composition to a plurality of fibers to make sized fibers, wherein the sizing composition comprises at least one of a curing agent chosen from at least one of an aliphatic polyamine, a cycloaliphatic polyamine, an aromatic polyamine, a polyamide, an amidoamine, a polyol, an acid anhydride, dicyandiamide, guanidine, and a formaldehyde resin;
    contacting the sized fibers with an epoxy resin composition to form a resin-fiber amalgam, wherein the epoxy resin composition includes 50 wt. % to 5 wt. % of an amount of the curing agent present in the resin-fiber amalgam; and
    curing the resin-fiber amalgam to form the fiber-reinforced epoxy composite.

2. The method of claim 1, wherein the epoxy resin composition includes none of the curing agent that is present on the sized fibers.

3. The method of claim 1, wherein the epoxy resin composition comprises an accelerator for the epoxy resin composition, wherein the accelerator is chosen from at least one of an alcohol, a carboxylic acid, an amine, a urea compound, and a Lewis acid.

4. The method of claim 1, wherein the epoxy resin is chosen from at least one of diglycidyl ethers of bisphenol A, diglycidyl ethers of bisphenol F, aliphatic epoxy resins, cycloaliphatic epoxy resins, glycidyl epoxy resins, glycidylamine epoxy resins, epoxy phenol novolacs, and epoxy cresol novolacs.

5. The method of claim 1, wherein the epoxy resin comprises bisphenol A diglycidyl ether.

6. The method of claim 1, wherein the sizing composition further comprises a film former.

7. A method of extending a shelf-life of an epoxy resin composition used to make a fiber-reinforced epoxy composite, the method comprising:
    applying a sizing composition to a plurality of fibers to make sized fibers, wherein the sizing composition comprises a curing agent chosen from at least one of an aliphatic polyamine, a cycloaliphatic polyamine, an aromatic polyamine, a polyamide, an amidoamine, a polyol, an acid anhydride, dicyandiamide, guanidine, and a formaldehyde resin;
    contacting the sized fibers with the epoxy resin composition to form a resin-fiber amalgam, wherein the epoxy resin composition includes 50 wt. % to 5 wt. % of an amount of the curing agent present in the resin-fiber amalgam, and wherein the epoxy resin composition has at least twice the shelf-life of a resin mixture comprising the epoxy resin composition mixed with the curing agent; and curing the resin-fiber amalgam to form the fiber-reinforced epoxy composite.

8. The method of claim 7, wherein the resin mixture comprises all of the curing agent required to make the fiber-reinforced epoxy composite.

9. The method of claim 7, wherein the epoxy resin composition further comprises an accelerator chosen from at least one of an alcohol, a carboxylic acid, an amine, a urea compound, and a Lewis acid.

10. The method of claim 9, wherein the epoxy resin composition comprises all of the accelerator required to make the fiber-reinforced epoxy composite.

11. The method of claim 7, wherein the epoxy resin composition is chosen from at least one of diglycidyl ethers of bisphenol A, diglycidyl ethers of bisphenol F, aliphatic epoxy resins, cycloaliphatic epoxy resins, glycidyl epoxy resins, glycidylamine epoxy resins, epoxy phenol novolacs, and epoxy cresol novolacs.

12. The method of claim 7, wherein the epoxy resin composition comprises bisphenol A diglycidyl ether.

* * * * *